(No Model.)

E. H. W. STAHLHUTH.
EXTENSION TABLE.

No. 464,528. Patented Dec. 8, 1891.

WITNESSES:
U. M. Hood.
J. R. Morrison.

INVENTOR
Ernst. H. W. Stahlhuth
BY
H. P. Hood.
ATTORNEY

United States Patent Office.

ERNST H. W. STAHLHUTH, OF COLUMBUS, INDIANA.

EXTENSION-TABLE.

SPECIFICATION forming part of Letters Patent No. 464,528, dated December 8, 1891.

Application filed May 6, 1891. Serial No. 391,719. (No model.)

*To all whom it may concern:*

Be it known that I, ERNST H. W. STAHLHUTH, a citizen of the United States, residing at Columbus, in the county of Bartholomew and State of Indiana, have invented a new and useful Improvement in Extension-Tables, of which the following is a specification.

My invention relates to an improvement in extension-tables. The object of my improvement is to provide an extension-table in which all of the parts are permanently connected to the table-frame.

The accompanying drawings illustrate my invention.

Figure 3:
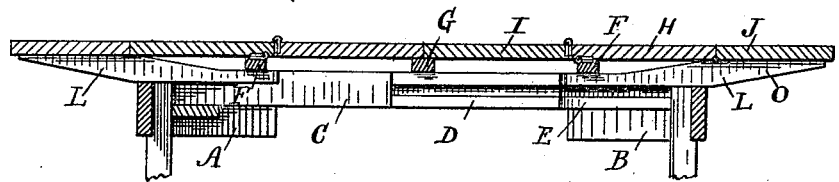
Figure 2:
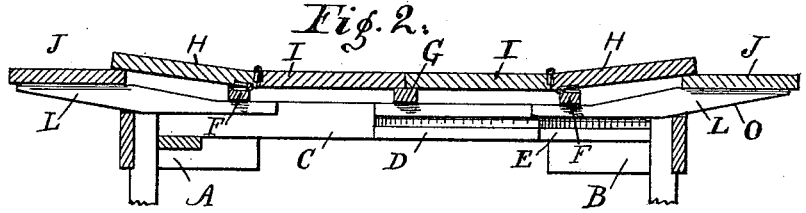
Figure 1:
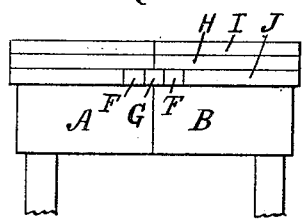
Figure 4:
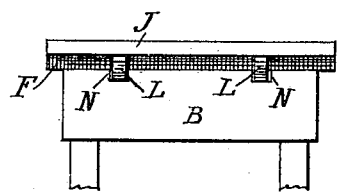

Figure 1 represents a side elevation showing the table closed. Fig. 2 represents a longitudinal section showing the parts partly extended. Fig. 3 represents a similar section showing the table fully extended. Fig. 4 represents an end elevation.

The extension-frame is of the usual form, consisting of the two principal sections A and B, to which the legs are attached, said sections being connected by the usual extension-slides C, D, and E. Rigidly secured to the upper edge of each of the sections A and B, near its inner end, is a cross-bar F, and to the central extension-slide D is secured a similar bar G, the arrangement being such that when the table is closed, as in Fig. 1, the bar G fills the space between the two bars F. The top consists of two like sections, each composed of three leaves H, I, and J. The leaves H are hinged, respectively, on the under side near the inner edge to the top of cross-bars F, and the leaves I are hinged, respectively, to the inner opposed edges of the leaves H in such a manner that they may be folded upon the upper sides of leaves H or be extended in the same plane therewith. Leaves J are each of the same thickness as the bars F, and are each mounted on a pair of arms L L, which are arranged to slide in notches N N, formed in the main frame. Said arms are provided on their outer under edges with an incline O and they engage the under sides of the bars F with the upper edges of their inner ends when they are extended, the arrangement being such that when leaves J are pushed inward they rest upon the main frame and support the outer edges of the leaves H, as in Fig. 1; but when drawn out they are raised to the same plane as the leaves H, as shown in Fig. 3, the outer edges of leaves H being then sustained by the upper edges of the arms L.

When the table is closed, leaves J are slid under the leaves H and leaves I are folded upon the leaves H, so that leaves J form the upper surface of the table. In extending the table, the main-frame sections A and B are drawn apart to the full extent of the extension-slides. Leaves I are then folded over into the opening thus made, the free edges of the leaves resting upon the cross-bar G. The leaves J are next drawn from under the leaves H, being at the same time forced by the inclined edges O of arms L to rise to the same plane as the leaves H, which, being hinged at their inner edges on the under sides to the cross-bars F, yield in a vertical plane at their free edges to the rising movement of the leaves J until said leaves are fully extended, when leaves H fall to their normal position and rest their free edges upon the arms L.

Having thus described my improved table, I claim as my invention—

In an extension-table, the main frame formed in two sections connected by extension-slides, the cross-bars F F, secured to said frame-sections, the cross-bar G, secured to the slides, leaves H, hinged to said bars F, as described, leaves I, hinged to the opposed edges of leaves H, and the extension-leaves J, having arms L arranged to slide in the main frame, all combined and arranged to co-operate substantially as shown and described.

ERNST H. W. STAHLHUTH.

Witnesses:
ERNST F. STAHLHUTH,
HENRY W. STAHLHUTH.